US006662821B2

United States Patent
Jacobsen et al.

(10) Patent No.: US 6,662,821 B2
(45) Date of Patent: Dec. 16, 2003

(54) SYSTEM AND METHOD FOR CLOSING AN EXISTING VALVE IN RESPONSE TO A DETECTED LEAK

(75) Inventors: Ron Jacobsen, Hobe Sound, FL (US); Jack Craig, Boca Raton, FL (US); John Lumsden, Boca Raton, FL (US)

(73) Assignee: Rapid Emergency Shutoff Systems, Inc., Stuart, FL (US)

( * ) Notice: Subject to any disclaimer, the term of this patent is extended or adjusted under 35 U.S.C. 154(b) by 261 days.

(21) Appl. No.: 09/932,990

(22) Filed: Aug. 21, 2001

(65) Prior Publication Data

US 2002/0096213 A1 Jul. 25, 2002

Related U.S. Application Data

(60) Provisional application No. 60/263,822, filed on Jan. 23, 2001.

(51) Int. Cl.$^7$ .................. F16K 31/05; F16K 17/36; F16K 37/00; G05D 7/06
(52) U.S. Cl. ................... 137/312; 137/2; 137/78.1; 137/557; 251/129.03; 251/129.04; 251/129.11; 251/292; 340/605; 340/620; 361/178; 361/182; 700/282
(58) Field of Search ................ 137/312, 78.1, 137/557; 251/291, 292, 129.03, 129.04, 129.05, 129.11, 129.12; 307/118; 340/605, 620; 361/178, 180, 171; 700/275, 281, 282

(56) References Cited

U.S. PATENT DOCUMENTS

| | | | |
|---|---|---|---|
| 5,240,022 A | 8/1993 | Franklin | ............ 137/1 |
| 5,655,561 A | 8/1997 | Wendel et al. | ............ 137/79 |
| 5,967,171 A * | 10/1999 | Dwyer, Jr. | ............ 137/312 |
| 6,065,735 A * | 5/2000 | Clark | ............ 251/129.03 |
| 6,147,613 A * | 11/2000 | Doumit | ............ 340/605 |
| 6,170,798 B1 * | 1/2001 | Johnson et al. | ............ 137/78.1 |
| 6,186,162 B1 | 2/2001 | Purvis et al. | ............ 137/312 |
| 6,293,515 B1 * | 9/2001 | Clark | ............ 251/129.03 |
| 6,354,322 B2 * | 3/2002 | Clark | ............ 251/292 |
| 6,489,895 B1 * | 12/2002 | Apelman | ............ 340/605 |

* cited by examiner

*Primary Examiner*—George L. Walton
(74) *Attorney, Agent, or Firm*—Baker & Hostetler LLP (57) ABSTRACT

The invention is system and method for detecting a leak and operating an existing valve in response to the detected leak. In this regard, a receiving unit may be installed on an existing shutoff valve. The valve may control the flow of a fluid into a site. A transmitting unit may be installed in the vicinity of an appliance receiving the fluid. The transmitting unit may include a detector capable of detecting the fluid. In response to the detector detecting the fluid, the transmitting unit may transmit a signal including a unique 32 bit code. A receiver within the receiving unit may be capable of receiving the signal. Additionally, a PIC microprocessor within the receiving unit may be configured to receive the signal from the receiver and determine if the signal contains the code. In response to determining the signal contains the code, the PIC may control a motor to operate (e.g., turn off) the valve. The motor may be configured for attachment to the valve via a coupler.

50 Claims, 6 Drawing Sheets

SYSTEM AND METHOD FOR CLOSING AN EXISTING VALVE IN RESPONSE TO A DETECTED LEAK

This application claims the benefit of provisional application No. 60/263,822 filed on Jan. 23, 2001.

FIELD OF THE INVENTION

This invention relates generally to a leak detection system. More particularly, the invention pertains to a detection system capable of closing an existing shutoff valve in response to a detected leak.

BACKGROUND OF THE INVENTION

It is generally known that a fluid (e.g., water, oil, methane, propane, carbon monoxide, etc.) may be transferred by utilizing a supply line (or pipe). In a typical situation, a main supply line may enter a site (e.g., room, building, building complex, etc.) and then branch off into a plurality of auxiliary supply lines. Each auxiliary supply line of the plurality of auxiliary supply lines may supply a device (or appliance), or the auxiliary supply line may branch further. In the event of damage to or maintenance of the auxiliary supply line system, it may be advantageous to substantially reduce the flow of fluid (i.e., shut off the flow of fluid). Main supply lines are thus generally equipped with a main shutoff valve at or near the point of site entry and typically before any branching.

A leak in an auxiliary supply line may cause substantial property damage and/or bodily harm if not dealt with in a timely fashion. Thus, systems have been developed to detect fluid leaks within a site and shut off the flow of fluid in the main supply line at or near the point of site entry. For example, U.S. Pat. Nos. 5,240,022; 6,186,162; and 5,655,561 disclose water detectors to activate water shutoff systems. The water shutoff system turns a specialized ball valve, the specialized ball valve having been installed on the main supply line. Although these types of mechanisms are relatively effective in shutting off the flow of water in main supply lines, each requires the installation a specialized ball valve by a certified plumber. Additionally, these types of systems are not capable of detecting non-conducting liquids or gasses.

SUMMARY OF THE INVENTION

In one respect, the invention is a system including a transmitting unit and a receiving unit. The transmitting unit includes a fluid detector and a transmitter connected to the fluid detector. The transmitter is capable of transmitting a signal in response to a detected fluid. The receiving unit including a receiver capable of detecting the signal, and an attachment mechanism having two ends. A first end of the attachment mechanism is attached to a valve and a motor is attached to a second end of the attachment mechanism. The motor is also attached to the receiving unit, such that, the motor is capable of operating the valve in response to the receiver detecting the signal.

In another respect, the invention is a method including detecting a fluid and transmitting a signal in response to the detecting step. The method further includes receiving the signal and operating a manual valve in response to the receiving step.

In yet another respect, the invention is a transmitting unit including a fluid detector, a memory configured to store a code, and a transmitter connected to the fluid detector and the memory. The transmitter is capable of transmitting a signal, the signal including the code, in response to a detected fluid.

In yet another respect, the invention is a method including detecting a fluid, retrieving a code from memory, and transmitting a signal, the signal including the code, in response to the detecting step.

In yet another respect, the invention is a receiving unit including a receiver capable of detecting the signal and an attachment mechanism having two ends. A first end of the attachment mechanism is attached to a valve and a motor is attached to a second end of the attachment mechanism. The motor is also attached to the receiving unit and, in this regard, the motor is capable of operating the valve in response to the receiver detecting the signal.

In yet another respect, the invention is a method including receiving a signal and mechanically operating a manual valve in response to the receiving step.

In yet another respect, the invention is a network including a first transmitting unit, a second transmitting unit, and a receiving unit in communication with the first transmitting unit and the second transmitting unit. Both the first transmitting unit and the second transmitting unit individually comprise a fluid detector, and a transmitter connected to the fluid detector. The transmitter is capable of transmitting a signal in response to a detected fluid. The receiving unit includes a receiver capable of detecting the signal and an attachment mechanism having two ends. A first end of the attachment mechanism is attached to a valve and a motor is attached to a second end of the attachment mechanism. The motor is further attached to the receiving unit. Thus, the motor is capable of operating the valve in response to the receiver detecting the signal.

In yet another respect, the invention is a network including a first receiving unit, a second receiving unit, and a transmitting unit in communication with the first receiving unit and the second receiving unit. Both the first receiving unit and the second receiving unit individually comprise a receiver capable of detecting a signal and an attachment mechanism having two ends. A first end of the attachment mechanism is attached to a valve and a motor is attached to a second end of the attachment mechanism. The motor is further attached to the receiving unit, such that, the motor is capable of operating the valve in response to the receiver detecting the signal. The transmitting unit includes a fluid detector and a transmitter connected to the fluid detector. The transmitter is capable of transmitting the signal in response to a detected fluid.

In yet another respect, the invention is a network including a first matched set. The first set includes one or more transmitting units and one or more receiving units in communication with the one or more transmitting units of the first set. The network further includes a second matched set. The second set includes one or more transmitting units and one or more receiving units in communication with the one or more transmitting units of the second set. Both the first matched set and the second matched set individually comprise one or more transmitting units and one or more receiving units in communication with the one or more transmitting units. Each of the one or more transmitting units individually includes a fluid detector and a transmitter connected to the fluid detector. The transmitter is capable of transmitting a signal in response to a detected fluid. Each of the one or more receiving units individually includes a receiver capable of detecting the signal and an attachment mechanism having two ends. A first end of the attachment mechanism is attached to a valve and a motor is attached to a second end of the attachment mechanism. The motor is further attached to the receiving unit, such that, the motor is capable of operating the valve in response to the receiver detecting the signal.

In comparison to known prior art, certain embodiments of the invention are capable of achieving certain advantages, including some or all of the following: (1) may utilize an existing valve; (2) may be easily installed; and (3) may be reconfigured by a user. Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

For simplicity and illustrative purposes, the principles of the invention are described by referring mainly to an exemplary embodiment thereof, particularly with references to a transmitter unit capable of detecting the presence of water. However, one of ordinary skill in the art would readily recognize that the same principles are equally applicable to, and can be implemented in, a transmitter unit capable of detecting the presence of any detectable substance, and that any such variations are within the scope of the invention.

Figure 1:
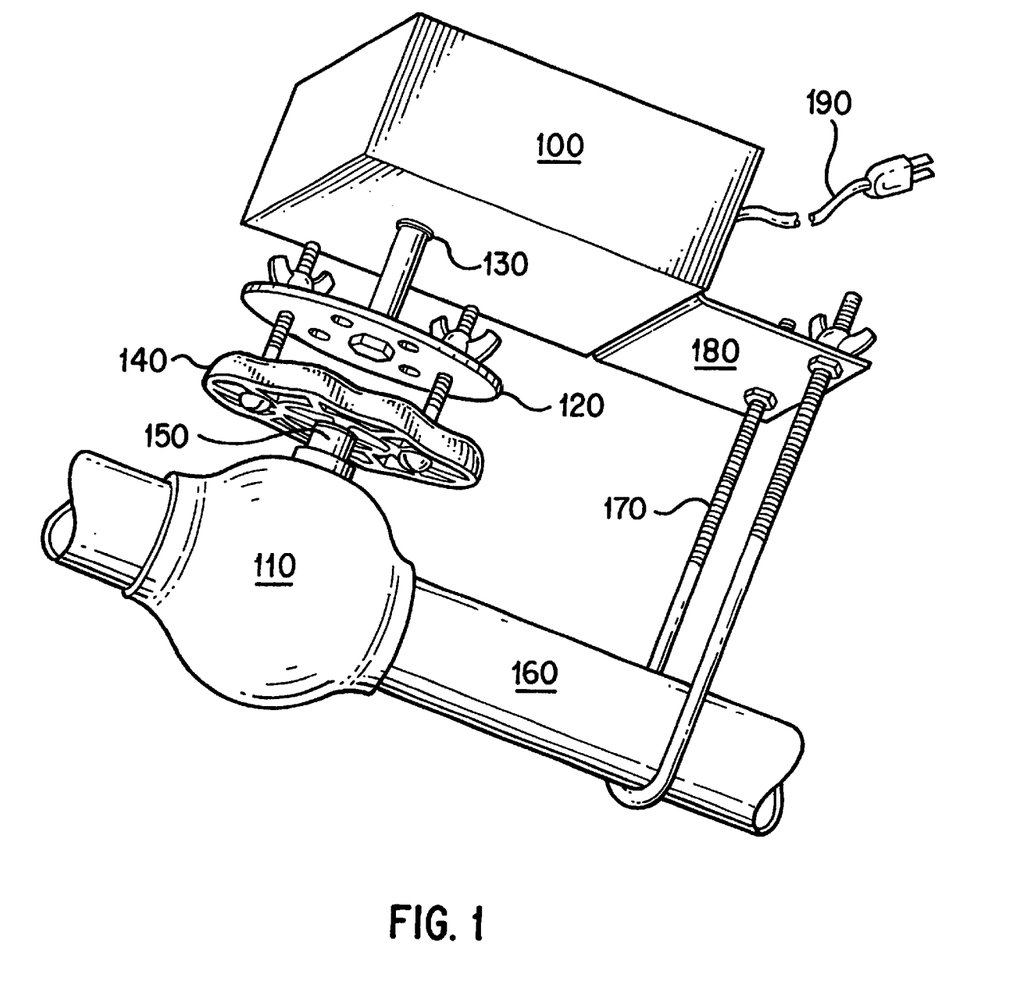
FIG. 1 illustrates a perspective view of a receiving unit in accordance with an embodiment of the invention.

FIG. 1 illustrates a perspective view of a receiving unit 100 in accordance with an embodiment of the invention. As depicted in FIG. 1, the receiving unit 100 is connected to a valve 110 via a coupler 120. The valve 110, as referenced throughout the disclosure, generally refers to a shutoff valve capable of being manually operated (e.g., turned) to control the flow of a fluid into a site. Because the specific type of valve to be operated by the receiving unit 100 will vary according to individual needs, the invention is not limited to any specific type of valve and may thus utilize any type of valve which may reasonably accomplish the goals of the invention. Examples of suitable valves employable in the invention include standard gate valve, ball valves, etc. However, as is readily apparent to those of ordinary skill in the art, other suitable valves may be used in the invention without departing from the scope of the invention.

In operation, the coupler 120 may be configured for attachment to a handle 140 of the valve 110. Because the specific type of handle may vary according to individual valves, the coupler 120 may thus be capable of attachment to any handle of the forementioned valves. However, as is readily apparent to those of ordinary skill in the art, additional couplers may be used interchangeably with the coupler 120 without departing from the scope of the invention.

In this regard, the receiving unit 100 may be configured with a standard square drive socket 130 for attachment to the coupler 120. Moreover, in situations in which the valve 110 is a standard gate valve, the standard square drive socket 130 may be capable of direct attachment to a handle shaft 150 of the valve 110.

The valve 110 controls the flow of fluid in a pipe 160. In a preferred environment in which an embodiment of the invention may be practiced, the pipe 160 is exposed and readily accessible. The receiving unit 100 may be secured to the pipe 160 by an attachment device 170, e.g., a threaded "J" bolt, a threaded "U" bolt, a plastic pipe clamp, etc. The attachment device 170 may be connected to the receiving unit 100 by a bracket 180. However, as is readily apparent to those of ordinary skill in the art, other suitable means of connecting the attachment device 170 to the receiving unit 100 may be used. Moreover, in situations in which the pipe 160 is not readily accessible, the receiving unit 100 may be configured for attachment to a suitable surface, e.g., a wall, a floor, a ceiling, etc.

Although not illustrated in FIG. 1, the standard square drive socket 130 is attached to a motor drive unit (not shown). The manner in which the valve 110 is turned off by the motor drive unit of the receiving unit 100 will be discussed in greater detail herein below.

Additionally, in some embodiments, a power cord 190 may be provided for plugging into an alternating current ("AC") outlet to provide power to the receiving unit 100. In other embodiments, the receiving unit 100 may be powered by batteries, any other power source, or any combination of above mentioned power sources.

Figure 2:
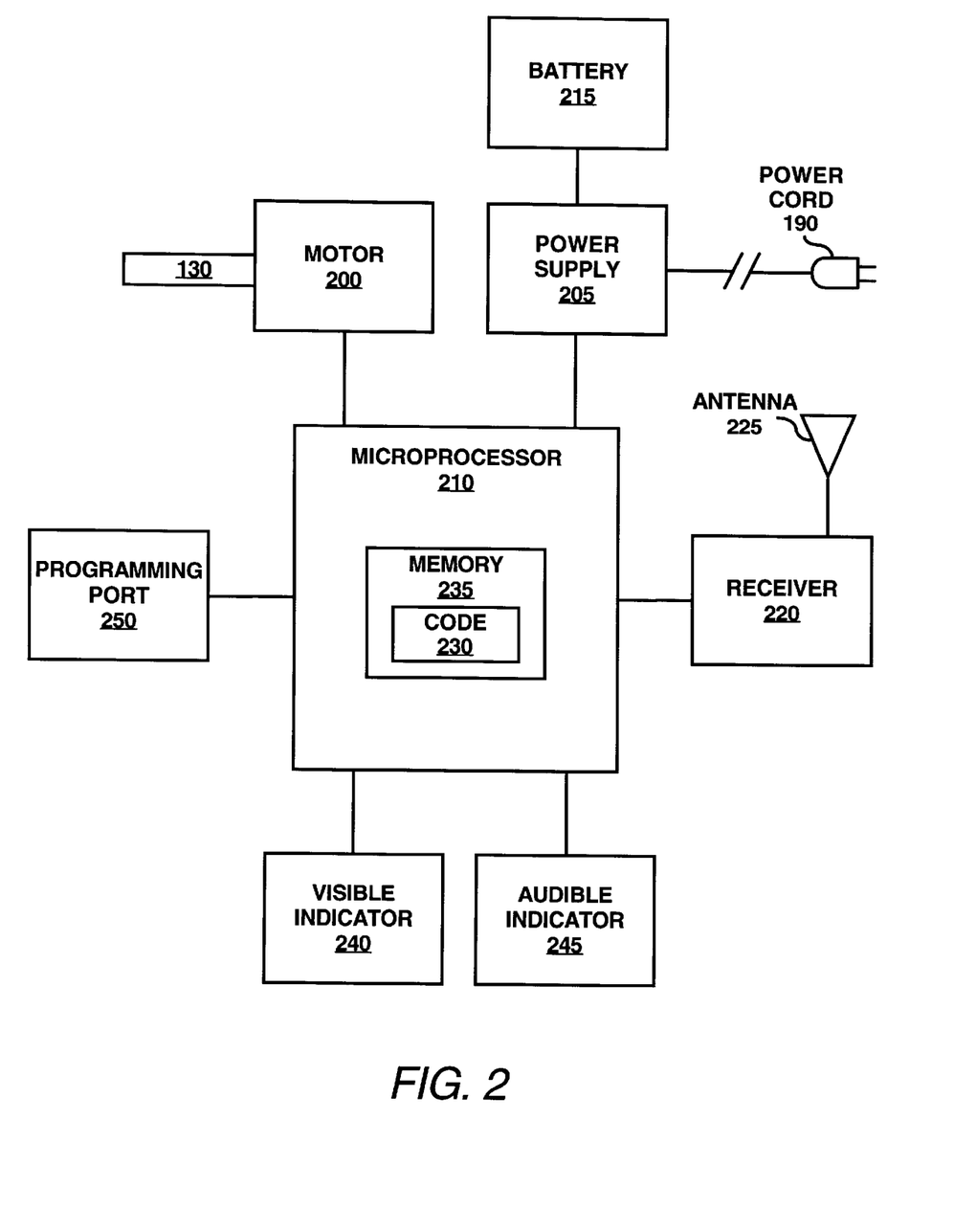
FIG. 2 illustrates a block diagram of a receiving unit in accordance with an embodiment of the invention.

FIG. 2 illustrates a block diagram of the receiving unit 100 in accordance with an embodiment of the invention. As mentioned in FIG. 1, the standard square drive socket 130 is attached to a motor drive unit 200. Although not illustrated in FIG. 2, the motor drive unit 200 includes a transmission configured to increase torque in a manner known to those of ordinary skill in the art. The motor drive unit 200, when running, may produce considerable spikes of voltage and/or current which could damage the electronics or cause misoperation. In this regard, in a preferred embodiment, filtering of the motor drive unit 200 electrical drive signal is performed by a common mode choke (not shown), one or more capacitors (not shown), and/or a transient suppressor (not shown). In addition to these measures, a diode (not shown) may be placed across power supply rails (not shown) to clamp any back electromotive force ("EMF") voltage produced by the motor drive unit 200 as a result of switching off the motor drive unit 200. However, as is readily apparent to those of ordinary skill in the art, other suitable means of applying torque to the standard square drive socket 130 may be used without departing from the scope of the invention.

A power supply 205 provides power to the motor drive unit 200 in response to a shutoff command from a microprocessor 210. The power supply 205 may utilize a battery 215. Additionally, the power supply 205 may utilize AC power provided by the power cord 190 plugged into an AC outlet (not shown). Moreover, the power supply 205 may re-charge the battery 215 utilizing AC power. The power supply 205 further provides power to the microprocessor 210. The power supply 205 may further be configured to reverse the polarity of power provided to the motor drive unit 200 in response to an open command from the microprocessor 210.

The microprocessor 210 may be configured to manage power, to monitor the power supply 205, to monitor a receiver module 220, and to issue commands to the motor drive unit 200. To manage power, the microprocessor 210 may be configured to sleep for a predetermined amount of time. Following the predetermined sleep time period, the microprocessor 210 may be configured to wake for a predetermined amount of time. During each predetermined wake period, the microprocessor 210 determines if the receiver module 220 is receiving a signal. The receiver module 220 may be configured to receive a signal from an antenna 225. Additionally, the microprocessor 210 may monitor the power supply 205 to determine the condition of the battery 215. In a preferred form, generally suitable examples of the microprocessor 210 may be PICMICRO ("PIC") series microprocessors available from MICROCHIP TECHNOLOGY INC. of Hauppauge, N.Y. A particular example of a suitable PIC is a PIC16CE62X erasable programmable read-only memory ("EPROM")-based PICmicro ® Complimentary Metal-Oxide Semiconductor ("CMOS"), fully-static, 8-bit microcontroller with electrically erasable programmable read-only memory ("EEPROM") data memory.

If the microprocessor 210 determines the receiver module 220 is receiving a signal, the microprocessor 210 compares the data transmitted by the signal to a code 230 stored in a memory 235 within, or interfaced to, the microprocessor 210. According to a preferred embodiment of the invention, the code 230 is a unique 32-bit code transferred to the memory 235 from a DS2401 silicon serial number chip (not shown) available from DALLAS SEMICONDUCTOR of Dallas Tex. Alternatively, the code 230 may be composed of more or fewer bits and may or may not be substantially unique. Moreover, according to a preferred embodiment of the invention, the memory 235 is non-volatile.

If the microprocessor 210 determines the signal does contain the code 230, the microprocessor 210 may be configured to drive a visible indicator 240 and/or an audible indicator 245, and to issue a turn on command to the motor drive unit 200. Additionally, the microprocessor 210 may be configured to monitor the current being applied to the motor drive unit 200 to determine when the motor drive unit 200 has stalled and thereby, when the valve 110 has fully closed. Upon determining the motor drive unit 200 has stalled, the microprocessor 210 may be configured to issue a turn off command to the motor drive unit 200.

Figure 3:
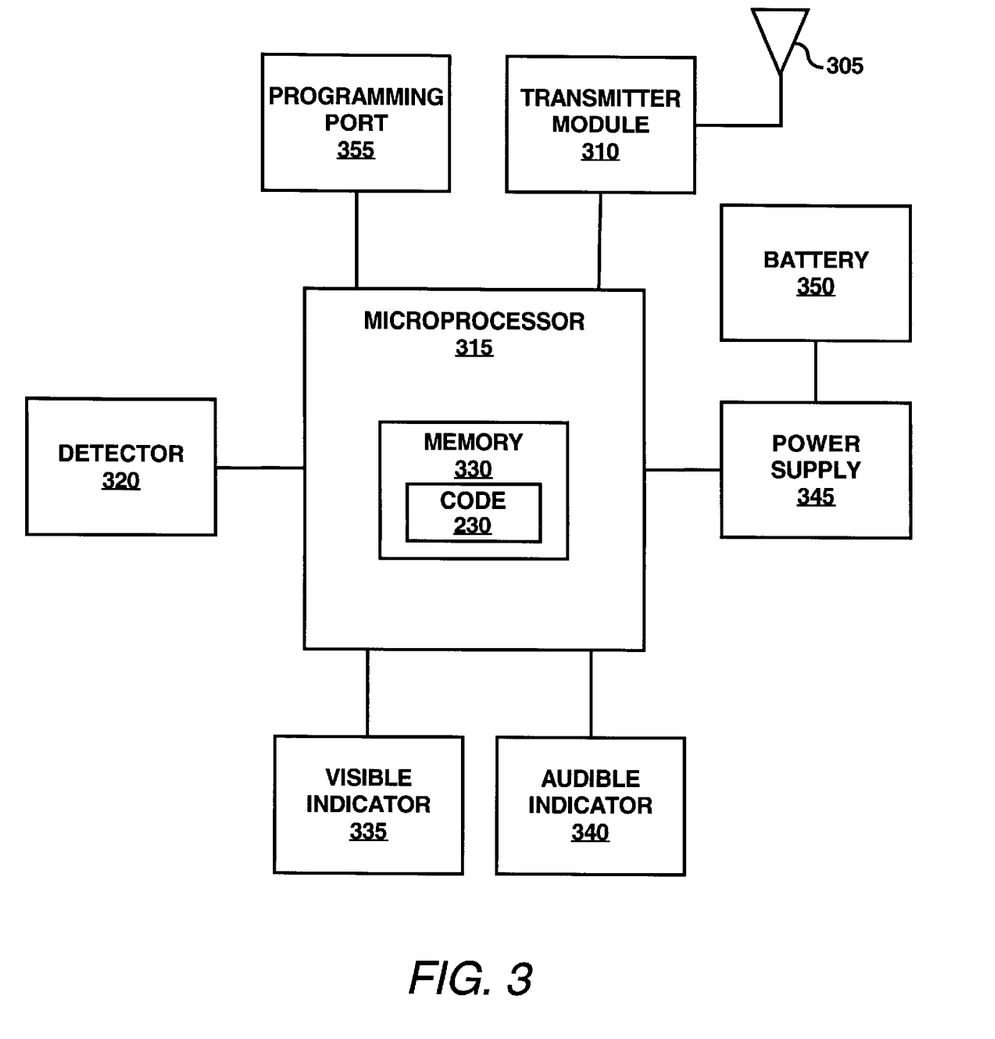
FIG. 3 illustrates a block diagram of a transmitting unit in accordance with an embodiment of the invention.

The microprocessor 210 may further be configured to communicate with a programming port 250. The programming port 250 is preferably configured for two way communication with the microprocessor 210 and a transmitting unit 300 (as illustrated in FIG. 3) via a ribbon cable (not shown). The manner in which the transmitting unit 300 and the receiving unit 100 are configured to communicate will be discussed in greater detail herein below.

The receiving unit 100 may be configured with a means by which a user may signal the microprocessor 210 to open the valve 110. In this respect, the microprocessor 210 may be configured to issue a command to turn on the motor drive unit 200 in the reverse direction. Additionally, the microprocessor 210 may be configured to monitor the current being applied to the motor drive unit 200 to determine when the motor drive unit 200 has stalled and thereby, when the valve 110 has fully closed. Upon determining the motor drive unit 200 has stalled, the microprocessor 210 may be configured to issue a turn off command to the motor drive unit 200.

FIG. 3 illustrates a block diagram of the transmitting unit 300 in accordance with an embodiment of the invention. The transmitting unit 300 is configured to transmit a signal to the receiving unit 100 in response to detecting the presence of a fluid. In this regard, the transmitting unit 300 includes an antenna 305. The antenna 305 is capable of transmitting a signal generated by a transmitter module 310. In a preferred form, the antenna 305 is a LDA8220D Series multilayer chip antenna capable of transmitting a signal at 916.6 MHz. Specific examples of suitable antenna employable in the transmitting unit 300 are available from MURATA ELECTRONICS of Smyrna, Ga.

The transmitter module 310 is connected to the antenna 305 and configured to generate a signal in response to receiving data from a microprocessor 315. In a preferred form, the transmitter module 310 is a TX6000 Series transmitter capable of generating a signal at 916.6 MHz. Specific examples of suitable transmitters employable in the transmitting unit 300 are available from RFM CO. of Dallas, Tex. The generated signal includes the data from the microprocessor 315.

The microprocessor 315 may be configured to send data to the transmitter module 310 in response to receiving a signal from a detector 320. The data may include the code 230 stored in a memory 330. According to a preferred embodiment of the invention, the memory 330 is non-volatile. The memory 330 may be built into, or interface with, the microprocessor 315. Furthermore, the microprocessor 315 may be configured to drive a visible indicator 335 and/or an audible indicator 340, in response to receiving a signal from the detector 320. Additionally, the microprocessor 315 may manage power consumption of the transmitting unit 300. In this regard, the microprocessor 315 remains in sleep mode until a signal is received from the detector 320. In a preferred form, the microprocessor 210 is a PIC12CE67X CMOS, fully-static, 8-bit microcontroller with integrated analog-to-digital ("A/D") converter and EEPROM data memory.

According to a preferred embodiment of the invention, the detector 320 is capable of detecting water. However, as is readily apparent to those of ordinary skill in the art, suitable detectors may include any detector capable of closing a contact or generating a logic 1 output. In operation, the detector 320 may be a field effect transistor ("FET") capable of completing a circuit in response to detecting the presence of water. In a manner know to those of ordinary skill in the art, the activation of the FET causes the microprocessor 315 to "wake up" and transmit the code 230, indicating that an event has occurred.

A power supply 345 provides power for the transmitting unit 300. The power supply 345 may utilize a battery 350. Alternatively, the power supply 345 may utilize any other power source, or any combination of power sources known to those skilled in the art.

A programming port 355 is connected to the microprocessor 315. The programming port 355 is preferably configured for two way communication between the microprocessor 315 and, via a ribbon cable (not shown) the programming port 250 of the receiving unit 100 (FIG. 1). During an initialization of the transmitting unit 300, the ribbon cable connects the programming port 355 to the programming port 250 for transferring the code 230 from the receiving unit 100 to the transmitting unit 300. Alternatively, the code 230 may originate on the transmitting unit 300 and be transferred in the opposite direction.

Figure 4:
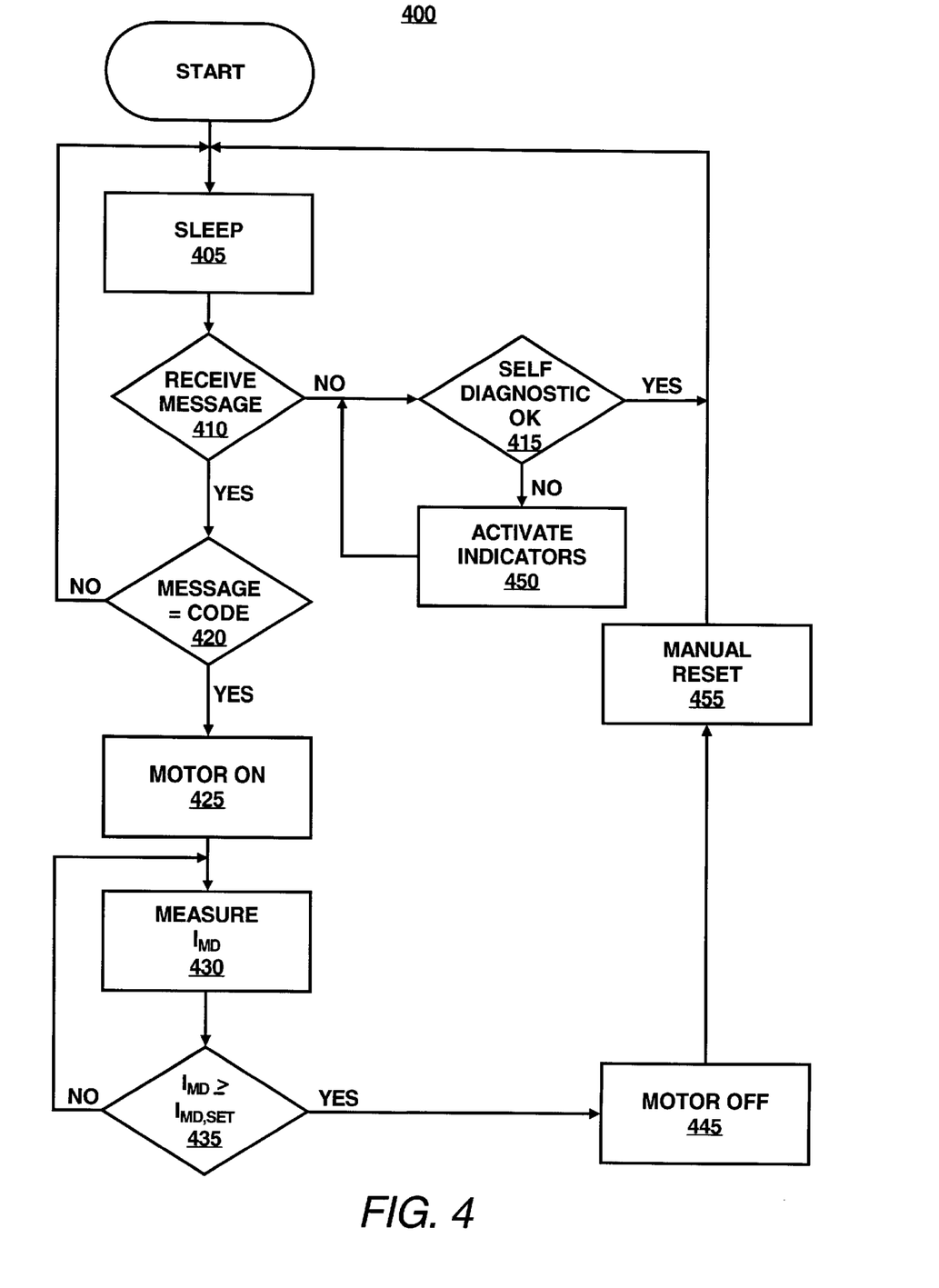
FIG. 4 is a flow chart depicting a manner in which the receiving unit illustrated in FIG. 2 may be practiced.

FIG. 4 is a flow chart of a method 400 depicting a manner in which the receiving unit 100 illustrated in FIG. 2 may be practiced. Accordingly, the following description of FIG. 4 will be made with particular reference to those features illustrated in FIG. 2. As shown in FIG. 4, after the receiving unit 100 is turned on, the microprocessor 210 sleeps for a predetermined length of time ("$T_{sleep}$") in step 405. The time $T_{sleep}$ is determined based upon system design. In general, the time $T_{sleep}$ may depend upon the following factors: system application, battery capacity, optimization of the system, etc. The time $T_{sleep}$ may be between about 0 and 100 seconds. In a preferred form, the time $T_{sleep}$ is 60 seconds.

In step 410, the microprocessor 210 wakes up and monitors the receiver module 220 for a predetermined length of time ("$T_{wake}$"). The time $T_{wake}$ is determined based upon system design. In general, the time $T_{wake}$ may depend upon the following factors: system application, battery capacity, optimization of the system, etc. The time $T_{wake}$ may be between about 1 and 10 seconds. In a preferred form, the time $T_{wake}$ is 6 seconds. If no signal is detected during the time $T_{wake}$, the microprocessor 210 may perform system diagnostics including checking battery status, self test, continuity checks, battery voltage, etc. in step 415.

If, in step 415, the microprocessor 210 determines that all tested systems pass the self diagnostic, the microprocessor 210 may sleep for the $T_{sleep}$ in step 405. If, the microprocessor 210 determines that at least one system does not pass the self diagnostic, the microprocessor 210 may activate the visible indicator 240 and/or audible indicator 245 in step 450. After activating the visible indicator 240 and/or audible indicator 245 in step 450, the method 400 may return to step 415 until the microprocessor 210 determines that all tested systems pass the self diagnostic.

If, in step 410, a signal is intercepted by the antenna 225, the receiver 220 receives the signal and forwards the signal to the microprocessor 210. The microprocessor 210 receives the signal and determines the encoded data. The microprocessor 210 then compares the data transmitted in the signal with the code 230. If, in step 420, the data transmitted in the signal is determined to be substantially different from the code 230, the microprocessor 210 may sleep for the time $T_{sleep}$ in step 405.

If, in step 420, the data transmitted in the signal is determined to be the same or substantially the same as the code 230, the method 400 may wait for confirmation. In a preferred form, confirmation may include determining that the code 230 has been received two additional times. Upon receiving confirmation, the microprocessor 210 may activate the visible indicator 240 and/or audible indicator 245. The microprocessor 210 may further send a signal to the motor drive unit 200 to turn on in step 425.

In step 430, the microprocessor 210 may monitor the current being applied to the motor drive unit 200 ("$I_{MD}$"). In step 435, the microprocessor 210 may compare the $I_{MD}$ to a predetermined value ("$I_{MD,SET}$"). The $I_{MD,SET}$ is determined based upon system design and the nominal current required to turn the motor drive unit 200. In a preferred form, the $I_{MD,SET}$ is substantially equal to four times the nominal current required to turn the motor drive unit 200. If the $I_{MD}$ is determined to be less than the $I_{MD,SET}$, the $I_{MD}$ is measured again in step 430. If the $I_{MD}$ is determined to be greater than or equal to the $I_{MD,SET}$ for a duration of 10 seconds, the microprocessor 210 may send a signal to the motor drive unit 200 to turn off in step 445. Following step 445, the method 400 may continue to activate the visible indicator 240 and/or audible indicator 245 until a manual reset command is detected in step 455.

In step 455, the method 400 may sleep for the time $T_{sleep}$ in step 405 in response to detecting the manual rest command.

Although not illustrated in FIG. 4, a programming mode may be initiated at any time by attaching the programming port 250 to the programming port 355 via a ribbon cable (not shown). During the programming mode, the microprocessor 210 may transmit the code 230 to the microprocessor 315 for storage in the memory 330.

Figure 5:
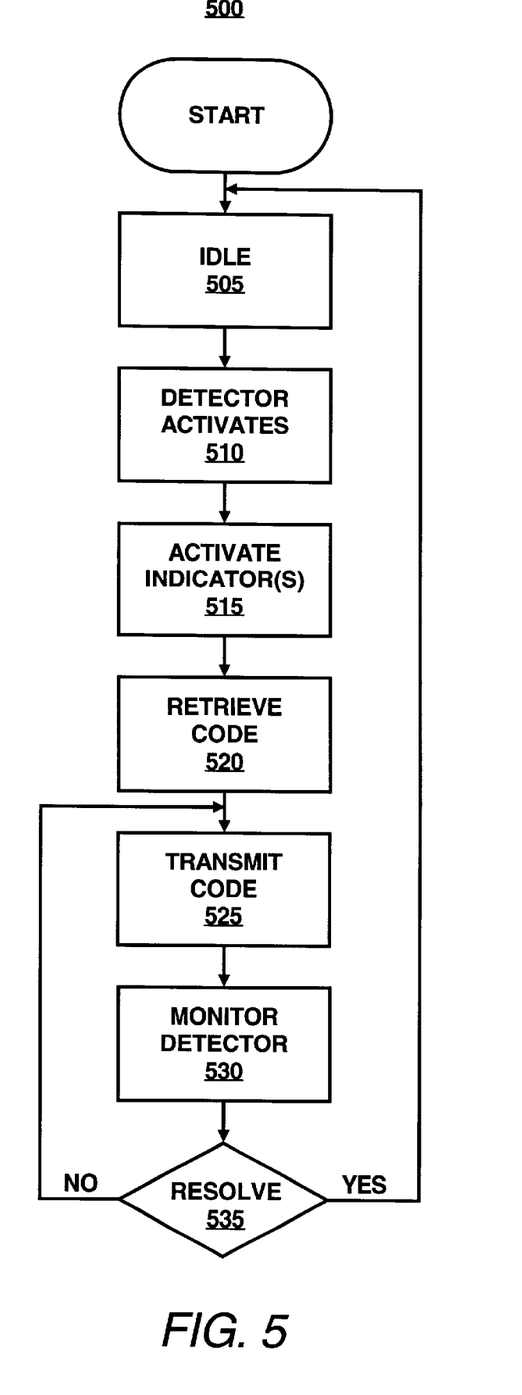
FIG. 5 is a flow chart depicting a manner in which the transmitting unit illustrated in FIG. 3 may be practiced.

FIG. 5 is a flow chart depicting a manner in which the transmitting unit 300 illustrated in FIG. 3 may be practiced. Accordingly, the following description of FIG. 5 will be made with particular reference to those features illustrated in FIG. 3. As shown in FIG. 5, the transmitting unit 300 is initialized in step 500. The initialization may be performed by turning the transmitting unit 300 on and downloading the code 230. The code 230 is downloaded in a manner discussed in greater detail herein below. Alternatively, the code 230 may be pre-programmed into the transmitting unit 300 and thus, initialization may be performed by turning the transmitting unit 300 on. Following the step 500, the microprocessor 315 goes into idle mode in step 505.

In step 510, the detector 320 may be activated by the presence of a fluid. In a preferred embodiment, the fluid is water, however, in other embodiments, various fluids (e.g., oil, methane, propane, carbon monoxide, etc.) may be detected concurrently or alternatively to water. The activation of the detector 320 causes the microprocessor 315 to "wake up".

In step 515, the microprocessor 315 may activate the visible indicator 335 and/or audible indicator 340. In step 520, the microprocessor 315 may be configured to retrieve the code 230 from the memory 330. The microprocessor 315 may further be configured to forward the code 230 to the transmitter module 310.

In step 525, the transmitter module 310 may, in response to the code 230, transmit the code 230 via the antenna 305. In step 530, the microprocessor 315 may monitor the detector 320. If, in step 535, the microprocessor 315 determines that the detector 320 is sensing the presence of the fluid, the microprocessor 315 may again forward the code 230 to the transmitter module 310 so that the transmitter module 310 may transmit the code 230 in step 525. If, in step 535, the microprocessor 315 determines that the detector 320 is not detecting the presence of the fluid, the microprocessor 315 may return to idle mode in step 505.

Although not illustrated in FIG. 5, a programming mode may be initiated at any time by attaching the programming port 250 to the programming port 355 via a ribbon cable (not shown). During the programming mode, the microprocessor 210 may transmit the code 230 to the microprocessor 315 for storage in the memory 330.

Figure 6A:
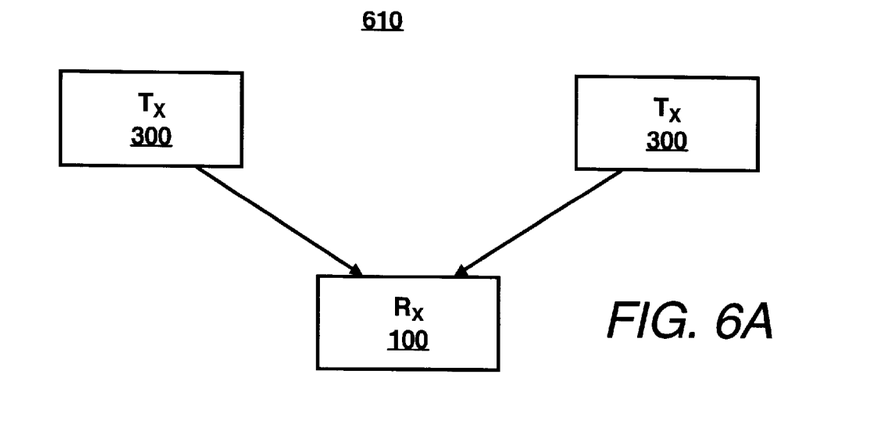
FIG. 6 illustrates networks of transmitting units and receiving units coded to operate together in accordance with various embodiments of the invention.

FIG. 6 illustrates various networks of transmitting units 300 and receiving units 100 coded to operate together in accordance with various embodiments of the invention. In one embodiment, and as illustrated by a network 610 in FIG. 6A, a plurality of transmitting units 300 may be coded to operate with one receiving unit 100. Although FIG. 6A depicts two transmitting units 300, it is to be understood that the invention is not limited to two transmitting units 300, but rather, the invention may include any reasonable number of transmitting units 300. In one respect, the number of transmitting units 300 may correspond to the number of appliances serviced by a main supply line located within a site. Accordingly, the receiving unit 100 may be configured to shut off the main supply line in the event that a leak is detected in the vicinity of one or more of the appliances.

Figure 6B:
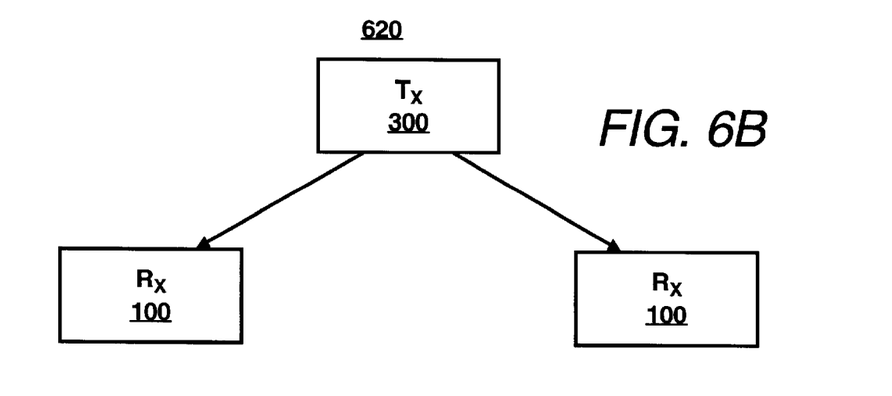

FIG. 6B illustrates a network 620 of a single transmitting unit 300 and multiple receiving units 100 coded to operate together in accordance with another embodiment of the invention. Although FIG. 6B depicts two receiving units 100, it is to be understood that the invention is not limited to two receiving units 100, but rather, the invention may include any reasonable number of receiving units 100. In one respect, the number of receiving units 100 may correspond to the number of different fluids utilized by an appliance. Accordingly, each receiving unit 100 may be configured to shut off a main supply line in the event that a leak is detected in the vicinity of the appliance.

Figure 6C:
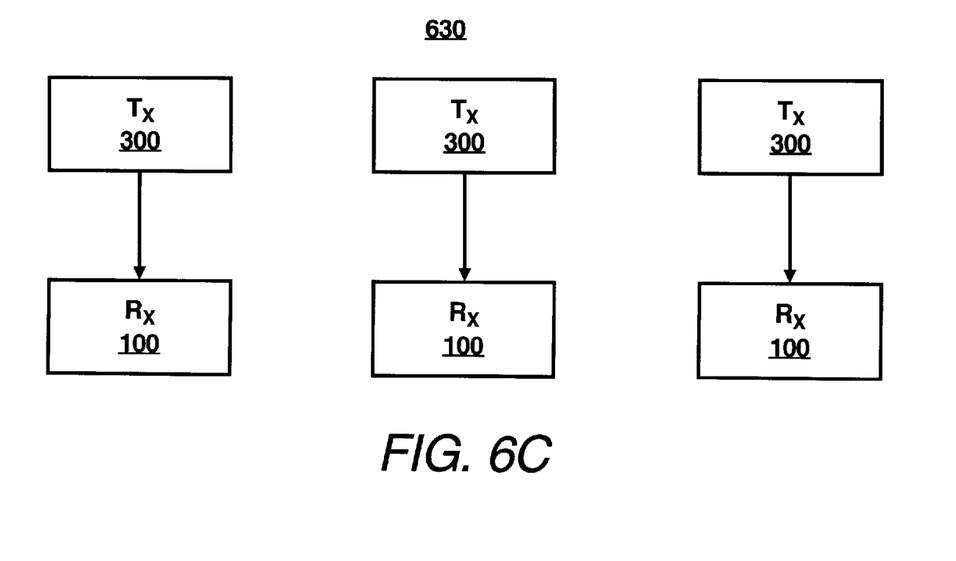

FIG. 6C illustrates a network 630 of sets of matched transmitting units 300 and receiving units 100 coded to operate together in accordance with yet another embodiment of the invention. As illustrated in FIG. 6C, a plurality of transmitting units 300 may be coded to operate with a plurality of respective receiving units 100. Although FIG. 6C depicts three transmitting units 300, each transmitting unit 300 configured to operate with one respective receiving unit 100, it is to be understood that the invention is not limited to three transmitting units 300, but rather, the invention may include any reasonable number of transmitting units 300. Additionally, although FIG. 6C depicts each transmitting unit 300 configured to operate with one respective receiving unit 100, it is to be understood that the invention is not limited to a one to one configuration, but rather, the invention may include any reasonable number of transmitting unit 300/receiving unit 100 ("Tx/Rx") configurations. In one respect, the number of Tx/Rx configurations may correspond to the number of apartments in an apartment complex. Accordingly, each receiving unit 100 may be configured to shut off the respective apartments' main supply line in the event that a leak is detected by the respective transmitting unit 300.

The system for closing an existing valve in response to a detected leak can exist in a variety of forms both active and inactive. For example, they can exist as software program(s) comprised of program instructions in source code, object code, executable code or other formats. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the HTML builder classes, their extensions or document-producing programs on a CD ROM or via Internet download. In a sense, the Internet itself, as an abstract entity, is a computer readable medium. The same is true of computer networks in general.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A system comprising a transmitting unit and a receiving unit, the transmitting unit comprising:
   a fluid detector; and
   a transmitter connected to the fluid detector, wherein the transmitter is capable of transmitting a signal in response to a detected fluid;
the receiving unit comprising:
   a receiver capable of detecting the signal;
   an attachment mechanism having two ends, a first end of the attachment mechanism being detachably secured to a handle of a manual valve; and
   a motor being attached to a second end of the attachment mechanism and the motor being attached to the receiving unit, wherein the motor is supplied an amount of current to generate torque to turn the valve toward a closed position in response to the receiver detecting the signal and the motor being controlled to stop turning the valve in response to the amount of current that generated to torque exceeds a predetermined current value, thereby closing the valve and terminating current supplied to the motor.

2. The system of claim 1, wherein the transmitting unit further comprises:
   a processor connected between the fluid detector and the transmitter.

3. The system of claim 2, wherein the processor is a PIC.

4. The system of claim 3, wherein the processor is further configured to generate the signal in response to a detected fluid.

5. The system of claim 1, wherein the signal contains a predetermined code.

6. The system of claim 5, wherein the code comprises a predetermined unique 32 bit code.

7. The network of claim 6 wherein the signal is a wireless signal.

8. The system of claim 7, wherein the transmitting unit further comprises:
   an antenna configured to transmit the signal.

9. The system of claim 1, wherein the receiving unit further comprises:
   a processor connected between the receiver and the motor.

10. The system of claim 9, wherein the processor is a PIC.

11. The system of claim 10, wherein the processor is further configured to determine if the signal contains the predetermined code.

12. A method comprising:
    detecting a fluid;
    transmitting a signal in response to the detecting step;
    receiving the signal; and
    operating a manual valve in response to the receiving the signal, wherein the manual valve, the motor, the motor being detachably secured to a handle of the manual valve, the motor operating to close the valve until an amount of current supplied to the motor exceeds a predetermined current value, thereby closing the valve and terminating current supplied to the motor.

13. The method of claim 12 further comprising:
    attaching a coupling mechanism to the manual valve.

14. The method of claim 12, wherein the fluid is one of the group consisting of a conductive liquid, combustible liquid, combustible gas, and carbon monoxide.

15. The method of claim 12, wherein the signal comprises a code.

16. The method of claim 15, wherein the code further comprises a predetermined unique 32 bit code.

17. The method of claim 12, wherein the signal is a wireless signal.

18. A transmitting unit comprising:

a fluid detector;

a memory device configured to store a code; and a transmitter connected to the fluid detector and the memory device, the transmitter being capable of transmitting a signal in response to a detected fluid, the signal comprising the code, a manual valve being operated in response to the code, wherein the manual valve is operated by a motor, the motor being detachably secured to a handle of the manual valve, the motor operating to close the valve, thereby closing the valve and terminating current supplied to the motor.

19. The system of claim 18, wherein the transmitting unit further comprises:

a processor connected between the fluid detector and the transmitter.

20. The system of claim 19, wherein the processor is a PIC.

21. The system of claim 20, wherein the processor is further configured to generate the signal in response to a detected fluid.

22. The system of claim 18, wherein the code is a predetermined substantially unique 32 bit code.

23. The system of claim 18, wherein the transmitting unit further comprises:

an antenna configured to transmit the signal.

24. The system of claim 23, wherein the signal is a wireless signal.

25. A method comprising:

detecting a fluid;

retrieving a code from a memory device; and transmitting a signal, in response to detecting the fluid, the signal comprising the code, a manual valve being operated in response to the code, wherein the manual valve is operated by a motor, the motor being detachably secured to a handle of the manual valve, the motor operating to close the valve until an amount of current supplied to the motor exceeds a predetermined current value, thereby closing the valve and terminating current supplied to the motor.

26. The method of claim 25, wherein the fluid is one of the group consisting of a conductive liquid, combustible liquid, combustible gas, and carbon monoxide.

27. The method of claim 25, wherein the code further comprises a predetermined unique 32 bit code.

28. The method of claim 25, wherein the signal is a wireless signal.

29. A receiving unit comprising:

a receiver capable of detecting the signal;

an attachment mechanism having two ends, a first end of the attachment mechanism being detachably secured to a handle of a manual valve; and a motor being attached to a second end of the attachment mechanism and the motor being attached to the receiving unit, wherein the motor is supplied an amount of current to generate torque to turn the valve toward an off position in response to the receiver detecting the signal and the motor being controlled to stop turning the valve in response to the amount of current exceeding a predetermined current value, thereby closing the valve and terminating current supplied to the motor.

30. The system of claim 29, wherein the receiving unit further comprises:

a processor connected between the receiver and the motor.

31. The system of claim 30, wherein the processor is a PIC.

32. The system of claim 29, wherein the signal comprises a code.

33. The system of claim 32, wherein the code comprises a predetermined substantially unique 32 bit code.

34. The system of claim 33, wherein the processor is configured to determine if the signal contains the predetermined code.

35. The system of claim 29, wherein the receiving unit further comprises an antenna configured to receive the signal.

36. The system of claim 35, wherein the signal is a wireless signal.

37. A method comprising:

receiving an electrical signal; and automatically operating a manual valve in response to receiving the electrical signal, the manual valve being operated in response to the signal, wherein the manual valve is operating to shut off the valve until an amount of current supplied to the motor exceeds a predetermined current value, thereby closing the valve and terminating current supplied to the motor.

38. The method of claim 37 further comprising:

attaching a coupling mechanism to the manual valve.

39. The method of claim 37, wherein the signal comprises a code.

40. The method of claim 39, wherein the code comprises a predetermined unique 32 bit code.

41. The method of claim 37 wherein the receiving step is performed wirelessly.

42. A network comprising:

a first transmitting unit;

a second transmitting unit; and a receiving unit in communication with the first transmitting unit and the second transmitting unit, wherein both the first transmitting unit and the second transmitting unit individually comprise:

a fluid detector; and a transmitter connected to the fluid detector, wherein the transmitter is capable of transmitting a signal in response to a detected fluid; and wherein the receiving unit comprises:

a receiver capable of detecting the signal;

an attachment mechanism having two ends, a first end of the attachment mechanism being detachably secured to a handle of a manual valve; and a motor being attached to a second end of the attachment mechanism and the motor being attached to the receiving unit, wherein the motor is supplied an amount of current to generate torque to turn the valve toward an off position in response to the receiver detecting the signal and the motor being controlled to stop turning the valve in response to the amount of current exceeding a predetermined current value, thereby closing the valve and terminating current supplied to the motor.

43. The network of claim 42 wherein the signal is a wireless signal.

44. The network of claim 43 wherein each transmitting unit further comprises an antenna configured to transmit the signal and wherein each receiving unit further comprises an antenna configured to receive the signal.

45. A network comprising:

a first receiving unit;

a second receiving unit; and a transmitting unit in communication with the first receiving unit and the second receiving unit, wherein both the first receiving unit and the second receiving unit individually comprise:
- a receiver capable of detecting a signal;
- an attachment mechanism having two ends, a first end of the attachment mechanism being detachably secured to a handle of a manual valve; and
- a motor being attached to a second end of the attachment mechanism and the motor being attached to the receiving unit, wherein the motor is supplied an amount of current to generate torque to turn the valve in response to the receiver detecting the signal and the motor being controlled to stop turning the valve toward a closed position in response to the amount of current exceeding a predetermined current value, thereby closing the valve and terminating current supplied to the motor; and wherein the transmitting unit comprises:
- a fluid detector; and
- a transmitter connected to the fluid detector, wherein the transmitter is capable of transmitting the signal in response to a detected fluid.

46. The network of claim 45 wherein the signal is a wireless signal.

47. The network of claim 46 wherein each transmitting unit further comprises an antenna configured to transmit the signal and wherein each receiving unit further comprises an antenna configured to receive the signal.

48. A network comprising:

a first matched set, the first set comprising:
- one or more transmitting units; and
- one or more receiving units in communication with the one or more transmitting units of the first set; and a second matched set, the second set comprising:
- one or more transmitting units; and
- one or more receiving units in communication with the one or more transmitting units of the second set; and wherein both the first matched set and the second matched set individually comprise:
- one or more transmitting units;
- one or more receiving units in communication with the one or more transmitting units;

wherein each of the one or more transmitting units individually comprises:
- a fluid detector; and
- a transmitter connected to the fluid detector, wherein the transmitter is capable of transmitting a signal in response to a detected fluid; and wherein each of the one or more receiving units individually comprises:
- a receiver capable of detecting the signal;
- an attachment mechanism having two ends, a first end of the attachment mechanism being detachably secured to a handle of a manual valve; and
- a motor being attached to a second end of the attachment mechanism and the motor being attached to the receiving unit, wherein the motor is supplied an amount of current to generate torque to turn the valve toward an off position in response to the receiver detecting the signal and the motor being controlled to stop turning the valve in response to the amount of current exceeding a predetermined current value, thereby closing the valve and terminating current supplied to the motor.

49. The network of claim 48 wherein the signal is a wireless signal.

50. The network of claim 49 wherein each transmitting unit further comprises an antenna configured to transmit the signal and wherein each receiving unit further comprises an antenna configured to receive the signal.

* * * * *